(12) United States Patent
Pullen et al.

(10) Patent No.: US 11,897,532 B2
(45) Date of Patent: Feb. 13, 2024

(54) BUMPERS FOR CARTS

(71) Applicant: Rubbermaid Commercial Products LLC, Atlanta, GA (US)

(72) Inventors: Hillary A Pullen, Charlotte, NC (US);
Ryan M. Baker, Charlotte, NC (US);
Jeffrey S. Bertucci, Denver, NC (US);
Earle Cramer, Portage, MI (US)

(73) Assignee: Rubbermaid Commercial Products LLC, Atlanta, GA (US)

( * ) Notice: Subject to any disclaimer, the term of this patent is extended or adjusted under 35 U.S.C. 154(b) by 705 days.

(21) Appl. No.: 17/043,496

(22) PCT Filed: Apr. 5, 2019

(86) PCT No.: PCT/US2019/025978
§ 371 (c)(1),
(2) Date: Sep. 29, 2020

(87) PCT Pub. No.: WO2019/195672
PCT Pub. Date: Oct. 10, 2019

(65) Prior Publication Data
US 2021/0114645 A1 Apr. 22, 2021

Related U.S. Application Data

(60) Provisional application No. 62/653,964, filed on Apr. 6, 2018.

(51) Int. Cl.
*B62B 5/00* (2006.01)
(52) U.S. Cl.
CPC .................. *B62B 5/0006* (2013.01)

(58) Field of Classification Search
CPC .......... B60C 7/18; B60R 19/38; B60R 19/46; B60R 2019/1833; B60R 2019/1846; B62B 5/0006; B62B 2301/044
See application file for complete search history.

(56) References Cited

U.S. PATENT DOCUMENTS

| 1,335,752 A | 4/1920 | Ratchford |
| 1,336,031 A | 4/1920 | Gebhardt |
| 1,500,716 A * | 7/1924 | Popendick ................ B60B 9/26 301/84 |

(Continued)

FOREIGN PATENT DOCUMENTS

GB    2501771    * 11/2013    ............. B62B 3/008

OTHER PUBLICATIONS

PCT International Search Report and Written Opinion for PCT Application No. PCT/US2019/025978 dated Jun. 20, 2019 (10 pages).

*Primary Examiner* — Gregory A Blankenship
(74) *Attorney, Agent, or Firm* — Eversheds Sutherland (US) LLP

(57) ABSTRACT

Cart bumpers and carts including cart bumpers are described. In aspects, a cart bumper includes an outer contact wall, an inner rim, and a plurality of spokes extending from the inner rim to the outer contact wall, each spoke of the plurality of spokes defining a respective path. The outer contact wall and the plurality of spokes are configured to collapse in response to a mechanical force applied on the outer contact wall above a predetermined threshold force.

18 Claims, 10 Drawing Sheets

(56) References Cited

U.S. PATENT DOCUMENTS

| | | | | |
|---|---|---|---|---|
| 1,832,770 | A * | 11/1931 | Hallowell | B62B 3/008 280/47.16 |
| 1,888,726 | A | 11/1932 | Jarvis et al. | |
| 2,465,148 | A | 9/1944 | Coonen | |
| 2,935,330 | A * | 5/1960 | Millman | B62B 5/0006 293/19 |
| 3,140,111 | A * | 7/1964 | Dabroski | B60R 19/16 114/220 |
| 4,068,877 | A * | 1/1978 | Burleson | B60R 19/16 280/481 |
| 5,366,264 | A * | 11/1994 | Guay | B60P 3/12 293/125 |
| 6,454,361 | B1 | 9/2002 | Martin | |
| 6,467,519 | B1 | 10/2002 | Owen | |
| D844,541 | S | 4/2019 | Abe | |
| D925,858 | S * | 7/2021 | Pullen | B60C 7/18 D34/27 |
| 2003/0226204 | A1* | 12/2003 | Dodge | B62B 5/0006 5/663 |
| 2004/0069385 | A1* | 4/2004 | Timoney | B60B 9/26 152/69 |
| 2011/0225767 | A1* | 9/2011 | Taylor | B60B 33/0044 16/45 |
| 2013/0342001 | A1* | 12/2013 | Imamiya | B60C 7/18 301/6.5 |
| 2017/0297371 | A1* | 10/2017 | Sportelli | B32B 5/18 |
| 2017/0327141 | A1* | 11/2017 | Thuma | B62B 3/10 |
| 2018/0029422 | A1* | 2/2018 | Thompson | B60C 9/1807 |
| 2018/0065414 | A1* | 3/2018 | Huang | B60C 7/146 |
| 2018/0186567 | A1* | 7/2018 | Crowley, Jr. | B62B 5/0006 |
| 2019/0001768 | A1 | 1/2019 | Stone | |
| 2019/0009611 | A1 | 1/2019 | Abe | |
| 2019/0009624 | A1 | 1/2019 | Stone | |
| 2019/0039637 | A1* | 2/2019 | Thuma | B62B 3/10 |
| 2019/0241137 | A1* | 8/2019 | Pan | B60R 19/16 |
| 2020/0276861 | A1* | 9/2020 | Thompson | B60B 9/26 |
| 2021/0078365 | A1* | 3/2021 | Cron | B60C 7/14 |
| 2021/0114645 | A1* | 4/2021 | Pullen | B62B 5/0006 |
| 2022/0119026 | A1* | 4/2022 | Mcintyre | B62B 5/0006 |

* cited by examiner

SECTION B-B

SECTION C-C

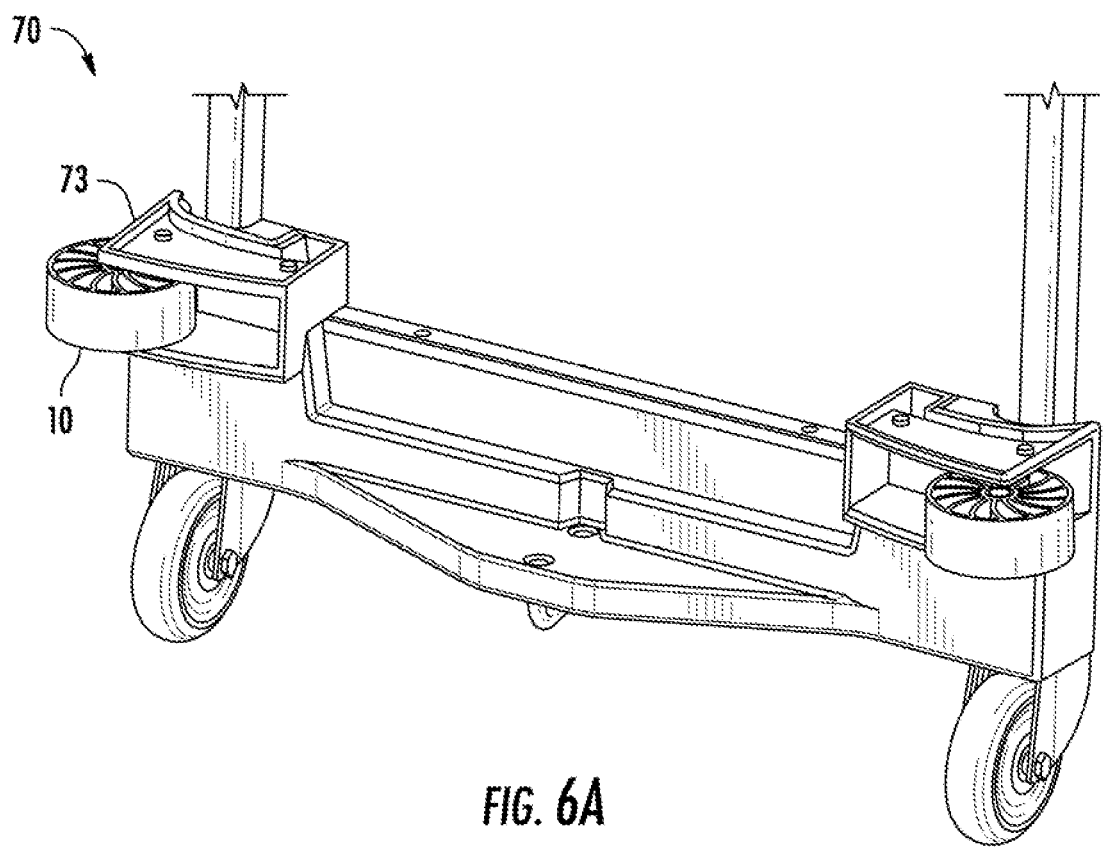
FIG. 6A
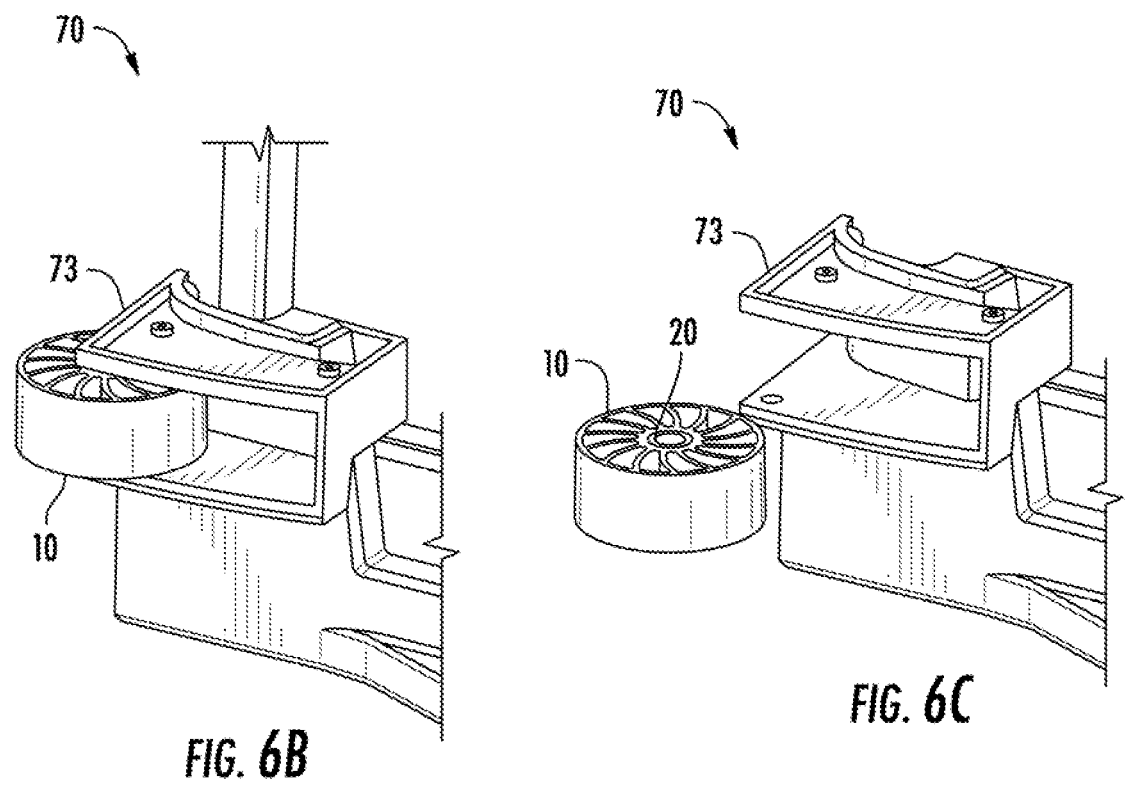
FIG. 6B
FIG. 6C

BUMPERS FOR CARTS

This application is a U.S. national stage application of International Application No. PCT/US2019/025978, filed Apr. 5, 2019, which claims the benefit of U.S. Provisional Application No. 62/653,964 filed on Apr. 6, 2018, which are incorporated herein by reference.

BACKGROUND

1. Technical Field

The disclosure relates generally to bumpers, and in particular, bumpers for carts, for example, utility carts, housekeeping carts, maintenance carts, or other carts.

2. Description of the Related Art

Carts such has housekeeping carts, utility carts, kitchen carts, industrial carts, or the like may be used to hold and transport items between different locations. One or more surfaces or edges of such carts may tend to contact or impact adjacent walls or structures, for example, in response to bumps, jolts, pushes, or mechanical forces applied to moving or static carts.

Carts may be provided with one or more bumpers to mitigate effects of contact or impact with walls or structures; however, known bumpers may be of limited effectiveness.

SUMMARY

The present disclosure describes bumpers for carts and carts including bumpers. In embodiments, bumpers according to the present disclosure are configured to absorb mechanical forces, for example, by at least partly deflecting, compacting, crumpling, or collapsing in response to mechanical forces greater than a predetermined threshold force. Bumpers according to the present disclosure may provide better cushioning compared to other bumpers, for example, compared to solid bumpers.

In embodiments according to the present disclosure, a cart bumper includes an outer contact wall, an inner rim, and a plurality of spokes extending from the inner rim to the outer contact wall, each spoke of the plurality of spokes defining a respective path. The outer contact wall and the plurality of spokes are configured to collapse in response to a mechanical force applied on the outer contact wall above a predetermined threshold force.

In embodiments, a cart includes a cart bumper according to the present disclosure.

BRIEF DESCRIPTION OF THE DRAWINGS

FIG. 6A is a conceptual partial perspective view of a cart including a cart bumper and a bumper axle according to embodiments.

FIG. 6B is a conceptual partial perspective view of the cart of FIG. 6A.

FIG. 6C is a conceptual partial exploded view of the cart of FIG. 6B.

Figure 1A:
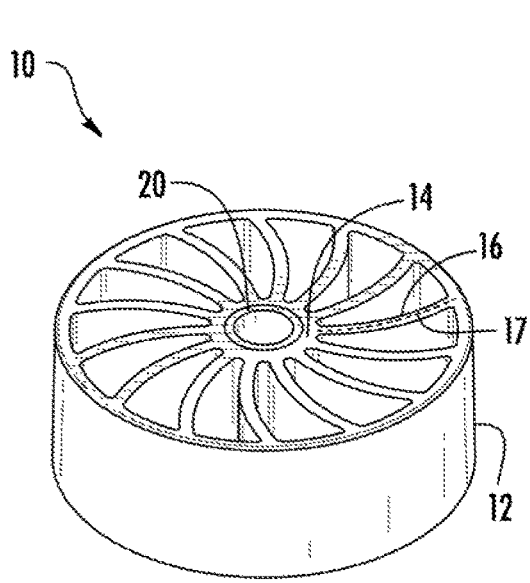
FIG. 1A is a conceptual perspective view of a cart bumper according to embodiments.

It is to be understood that the invention is not limited in its application to the details of construction and the arrangement of components illustrated in the drawings or set forth in the following description.

DETAILED DESCRIPTION

Carts, for example, utility carts, housekeeping carts, industrial carts, or clinical carts may be used for holding, carrying, and transporting objects. Bumps, shocks, impacts, or other mechanical forces applied to carts may cause the carts to deviate from a planned path and contact or impact adjacent walls or structures. Such impact may affect the integrity of the walls, structures, or the carts themselves. Carts may be provided with protective structures, for example bumpers. While solid or substantially rigid bumpers may provide some level of protection, single or repeated impact with solid or rigid bumpers may itself damage a wall or structures adjacent the cart.

Bumpers according to the present disclosure may deflect, compact, crumple, or collapse in response to a mechanical force greater than a predetermined threshold force, thus absorbing mechanical forces that would have been otherwise exerted on walls or adjacent structures. For example, bumpers may collapse away from the wall or structure and toward the cart. In embodiments, bumpers may resiliently collapse. Such resilient collapse may also reduce or prevent contact or impact between a housing of a cart and an adjacent wall or structure. Bumpers according to the present disclosure may provide better cushioning compared to other bumpers, for example, compared to solid bumpers. Solid bumpers may include material extending continuously, and without gaps or openings, between edges or surfaces of the bumpers. Bumpers according to the present disclosure may also be more durable compared to solid bumpers, and may promote durability of carts. Bumpers according to the present disclosure may also require fewer elements, be more compact, and require simpler manufacturing, for example, by not requiring springs or other suspension elements.

In embodiments according to the present disclosure, a cart bumper includes an outer contact wall, an inner rim, and a plurality of spokes extending from the inner rim to the outer contact wall, each spoke of the plurality of spokes defining a respective path. The outer contact wall and the plurality of spokes are configured to collapse in response to a mechanical force applied on the outer contact wall above a predetermined threshold force. In some embodiments, at least a portion of the bumper, for example, a portion of the outer contact wall, extends past outermost edges or surfaces of the cart, so that the portion of the bumper contacts an adjacent wall or structure before the edges or surfaces of cart. In some embodiments, the bumper may sufficiently absorb an applied shock or force such that while the bumper may deflect or collapse in response to contact with an adjacent wall or structure, the edges or the surfaces of the cart do not contact the adjacent wall or structure. In embodiments, a cart may include at least one bumper according to the present disclosure, for example, one, two, three, four, or more bumpers.

The extent and direction in which the bumper collapses may depend on the geometric and structural configuration of the bumper, for example, the length, width, height, path, distribution, and number of spokes, the contour length, width, height, and path, of the outer contact wall, and on the material properties of the bumper. For example, the softness, resilience, or flexibility of the material, such as characterized by Shore durometer, can be varied to control the force required to collapse the wheel and bounce back force without damaging wall surfaces.

Figure 1B:
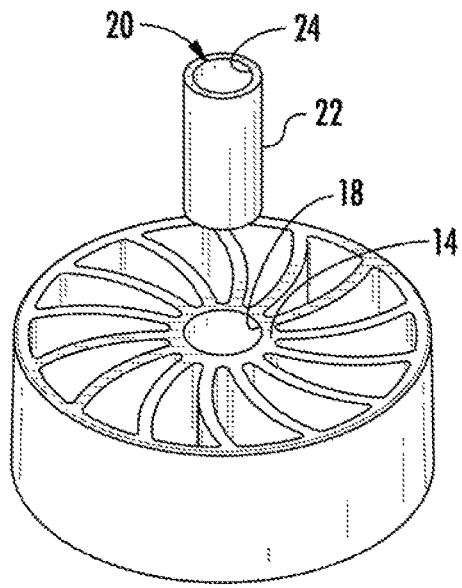
FIG. 1B is a conceptual exploded view of the cart bumper of FIG. 1A.
Figure 1C:
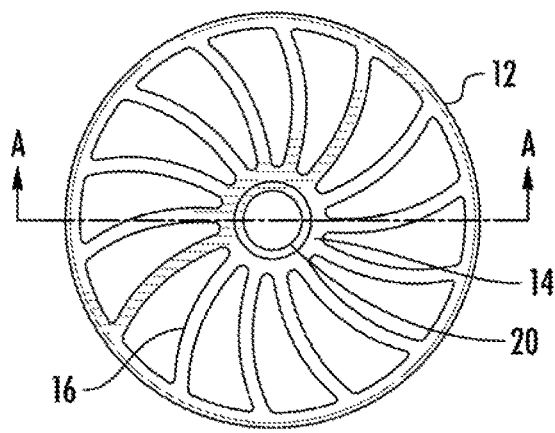
FIG. 1C is a conceptual top view of the cart bumper of FIG. 1A.
Figure 1D:
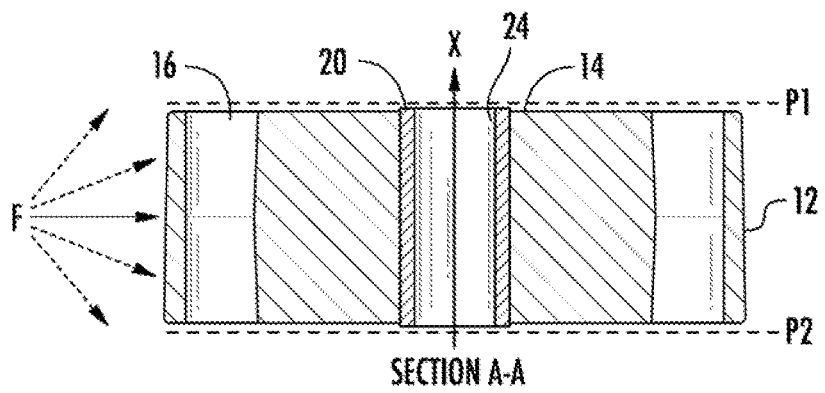
FIG. 1D is a conceptual cross-sectional view of the cart bumper of FIG. 1C, along section A-A.

FIG. 1A is a conceptual perspective view of a cart bumper 10 according to embodiments of the disclosure. FIG. 1B is a conceptual exploded view of cart bumper 10 of FIG. 1A. FIG. 1C is a conceptual top view of cart bumper 10 of FIG. 1A. FIG. 1D is a conceptual cross-sectional view of cart bumper of FIG. 1C, along section A-A.

Cart bumper 10 includes an outer contact wall 12, an inner rim 14, and a plurality of spokes 16 extending from the inner rim 14 to the outer contact wall 12 (i.e., between inner rim 14 and outer contact wall 12). Plurality of spokes 16 may include at least two spokes, at least three spokes, at least four spokes, at least five spokes, at least six spokes, at least 8 spokes, at least 10 spokes, at least 12 spokes, at least 14 spokes, at least 16 spokes, or any other suitable number of spokes. The number of spokes may be odd or even. Each spoke of the plurality of spokes 16 defines a respective path, for example, path 17.

Path 17 of a respective spoke may have any suitable geometric shape configured to promote or accommodate collapse of the respective spokes (and at least a portion of outer contact wall 12 adjacent the respective spoke). In embodiments, path 17 includes at least one of a circular arc segment, an elliptical arc segment, a parabolic arc segment, a hyperbolic arc segment, a spiral arc segment, a sinusoid arc segment, a sigmoid arc segment, a linear segment, or an undulating segment, or any combinations thereof. In some embodiments, the respective path 17 of each spoke of plurality of spokes 16 is substantially the same, for example, the same size and shape. In other embodiments, the respective path 17 of at least one respective spoke may differ from at least one another spoke of plurality of spokes 16. In some embodiments, alternating spokes may follow substantially the same respective path 17 between outer contact wall 12 and inner rim 14.

Cart bumper 10 may have any suitable diameter. For non-circular bumpers, the bumper diameter is the geometric average of all diameters passing through the geometric center of the bumper. In some embodiments, the diameter is at least 3 inches, or at least 3.5 inches, or at least 4 inches, or at least 5 inches, or at least 5.5 inches. In some embodiments, the diameter is in a range of from about 3.50 inches to about 6.00 inches.

Cart bumper 10 may have any suitable height. In some embodiments, the height is at least 1 inch, or at least 1.5 inches, or at least 2 inches, or at least 2.5 inches, or at least 3 inches. In some embodiments, the height is in a range of from about 1.50 inches to about 3.00 inches.

In embodiments, cart bumper 10 defines a rotational axis X extending through inner rim 14 and perpendicular to the respective paths of the plurality of spokes 16, and outer contact wall 12, inner rim 14, and plurality of spokes 16 extend in a direction along the rotational axis between a first plane P1 and a second plane P2.

In some embodiments, outer contact wall 12, inner rim 14, and plurality of spokes 16 may be connected and continuous (not defining openings or windows) between ends adjacent plane P1 and plane P2. In other embodiments, one or more of outer contact wall 12, inner rim 14, or plurality of spokes 16 may be connected but discontinuous (for example, define at least one opening or window) between ends adjacent plane P1 and plane P2.

At least a portion of outer contact wall 12 and at least one of plurality of spokes 16 are configured to collapse in response to a mechanical force F applied on outer contact wall 12 above a predetermined threshold force. In some embodiments, the predetermined threshold force is at least 10 lbf, at least 20 lbf, at least 30 lbf, at least 50 lbf, at least 60 lbf, or at least 80 lbf. In some embodiments, the predetermined threshold force is in a range from 10 lbf to 200 lbf, or from 10 lbf to 180 lbf, or from 10 lbf to 160 lbf, or from 40 lbf to 200 lbf, or from 40 lbf to 160 lbf, or from 60 lbf to 200 lbf, or from 60 lbf to 160 lbf. In some embodiments, the predetermined threshold force is 10 lbf, 20 lbf, 30 lbf, or 40 lbf, or 50 lbf, 60 lbf, 70 lbf, 80 lbf, 90 lbf, or 100 lbf.

In some embodiments, force F is generally in a direction inward toward rim 10. In other embodiments, force F may be in any direction relative to outer contact wall 12 and rim 10, for example, at any angle relative to an exterior surface defined by outer contact wall 12. In some embodiments, force F is generally in a direction aligned with a plane P1 or P2 defined by ends of outer wall 12, as shown by the solid arrow in FIG. 1D. In other embodiments, force F may be at any inclined angle relative to plane P1 or P2, as shown by the dashed arrows in FIG. 1D. Regardless of the direction of force F, one or more portions of cart bumper 10 may deflect, collapse, crumple, or otherwise deform along the direction of force F.

In some embodiments, in response to force F, outer contact wall 12 and plurality of spokes 16 may be configured to collapse, at least partially, inwardly toward inner rim 14. In some embodiments, outer contact wall 12 is configured to collapse inwardly by at least 0.1 inch, or by at least 0.25 inch, or by at least 0.5 inch, or by at least 1 inch toward inner rim 14, with one or more spokes of plurality of spokes 16 collapsing accordingly. In some such examples, outer contact wall 12 is configured to collapse inwardly by at least 1.5 inch toward the inner rim, with one or more spokes of plurality of spokes 16 collapsing accordingly. In some embodiments, collapse of cart bumper 10 may be described in terms of percentage compression of the bumper diameter. In some embodiments, cart bumper 10 may exhibit less than or about 50% compression, less than or about 40% compression, less than or about 30% compression, less than or about 25% compression, or less than or about 20% compression. For example, at 25% compression, the deflection of a bumper having a diameter D is 0.25*D. In some embodiments, cart bumper 10 has a deflection of less than or about 25% at a walking speed of 2 mph or 0.3 inch/sec. In some embodiments, cart bumper 10 exhibits 20% compression associated with a force of about 60 lbf, and 25% compression associated with a force of about 150 lbf. In some embodiments, cart bumper 10 has a diameter of 5.5 inches, and exhibits 20% compression associated with a force of 145 lbf and 25% compression associated with a force of 340 lbf.

In some embodiments, mounting ring 20 may be disposed substantially at a center of cart bumper 10, and cart bumper 10 may exhibit less than or about 50% compression. In this way, even when compressed, cart bumper 10 may prevent or reduce contact of an edge or surface of a cart on which cart bumper 10 is mounted with an adjacent wall or structure. In other embodiments, mounting ring 20 may be disposed offset from a center of cart bumper 10, and cart bumper 10 may exhibit less than or about 90% compression, or less than or about 80% compression, or less than or about 70% compression, or less than about less than or about 60% compression, or less than or about 50% compression, or otherwise a compression that maintains separation between a surface or edge of cart on which cart bumper 10 is mounted and an adjacent wall or structure.

Not all spokes of the plurality of spokes 16 may collapse with outer contact wall 12. For example, one, two, more than two, less than all, or all of spokes 16 may collapse depending on the extent or circumferential portion of outer contact wall 12 that collapses. In some examples, only a portion of outer contact wall 12 contacting a wall or structure exterior to a cart may collapse. In some examples, a portion of outer contact wall 12 contacting a wall or structure and another portion of outer contact wall 12 contacting a surface of a cart may collapse.

In embodiments, one or more portions of cart bumper 10 include a resilient flexible material. A resilient flexible material is a material that may resiliently deflect, collapse, crumple, or otherwise deform in response to an applied force (for example, force F), and biased to or tending to return to an undeflected configuration. In some embodiments, the resilient flexible material has a Shore durometer hardness of at least 50, or at least 60, or at least 70, or at least 80. In some embodiments, the resilient flexible material has a Shore durometer hardness in a range of about 50 to about 70, or in a range of about 45 to about 75, in in a range of about 40 to about 80. In some embodiments, the resilient flexible material of cart bumper 10 has a Shore durometer of at least 50, and cart bumper 10 exhibits less than about 50% compression. In some embodiments, the resilient flexible material of cart bumper 10 has a Shore durometer of at least 60, and cart bumper 10 exhibits less than about 50% compression. In some embodiments, the resilient flexible material of cart bumper 10 has a Shore durometer of at least 70, and cart bumper 10 exhibits less than about 50% compression.

In some embodiments, a matrix of the material may itself be both resilient and flexible. In other embodiments, a matrix of the material may provide or contribute to flexibility, while a reinforcing material embedded in or surrounded by the matrix may provide or contribute to resilience. In some embodiments, a combination of the matrix and the reinforcing material may exhibit both flexibility and resilience.

In some embodiments, one or more portions of cart bumper 10 includes the matrix and the reinforcing material in the matrix. In some such embodiments, the matrix is formed of the polymeric material. The reinforcing material may include one or more of metal, alloy, glass, ceramic, polymer, or any suitable reinforcing material. The reinforcing material may be in any suitable form, for example, one or more of woven fabric, nonwoven fabric, filaments, rods, fibers, plates, discs, mesh, grid, cage, or any suitable reinforcing form. In some such embodiments, the reinforcing material is substantially embedded in or surrounded by the polymeric material of the matrix. The reinforcing material may contribute to one or more of the strength, integrity, compressibility, or resilience of cart bumper 10.

In embodiments, the resilient flexible material includes a polymer. In some embodiments, the polymer includes a thermoplastic elastomer, a thermoplastic rubber, a polyurethane, a silicone, an isoprene, a natural rubber, or a synthetic rubber. In embodiments, the resilient flexible material consists essentially of a polyurethane. In some embodiments in which cart bumper 10 includes a reinforcing material, the matrix surrounding or embedding the reinforcing material may consist essentially of silicone or polyurethane.

In embodiments, one or more portions of cart bumper 10 are integrally formed. For example, plurality of spokes 16 may be integrally formed with inner rim 14, or plurality of spokes 16 may be integrally formed with outer contact wall 12, or plurality of spokes 16 may be integrally formed with both inner rim 14 and outer contact wall 12. In some such embodiments, outer contact wall 12, inner rim 14, and spokes 16 may be seamless such that no interface exists between any pair of outer contact wall 12, inner rim 14, or spokes 16. In some embodiments, one or more portions of cart bumper 10 are joined by at least one of a frictional joint, a mechanical joint, an adhesive joint, an overmold, or a weld. For example, plurality of spokes 16 may be joined with inner rim 14, or plurality of spokes 16 may be joined with outer contact wall 12, or plurality of spokes 16 may be joined with both inner rim 14 and outer contact wall 12.

Cart bumper 10 including contact wall 12, inner rim 14, and plurality of spokes 16 may be mounted or disposed on a cart, for example, on a bumper axle, as discussed herein. For example, the bumper axle may extend along the direction X in a central opening defined by inner rim 14. In some such embodiments, inner rim 14 may contact the bumper axle or face the bumper axle.

In some embodiments, outer contact wall 12 defines a circular periphery or contour. In other embodiments, outer contact wall 12 defines a non-circular contour. The non-circular contour may be symmetric or asymmetric along outer contact wall 12 or about axis X. Outer contact wall 12 may follow a contour that includes at least one of a circular arc segment, an elliptical arc segment, a parabolic arc segment, a hyperbolic arc segment, a spiral arc segment, a sinusoid arc segment, a sigmoid arc segment, a linear segment, or an undulating segment, or any combinations thereof. The contour may be piecewise-linear, piecewise-curved, or both piecewise-linear and -curved. In some embodiments, the contour is polygonal or generally polygonal, for example, triangular, rectangular, pentagonal, hexagonal, or any n-sided polygon, or n-sided general polygon where the sides of the general polygon may be straight or curved and define angles at their respective intersections.

In some embodiments, inner rim 14 defines a circular periphery or contour. In other embodiments, inner rim 14 defines a non-circular contour. The non-circular contour may be symmetric or asymmetric along inner rim 14 or about axis X. Inner rim 14 may follow a contour that includes at least one of a circular arc segment, an elliptical arc segment, a parabolic arc segment, a hyperbolic arc segment, a spiral arc segment, a sinusoid arc segment, a sigmoid arc segment, a linear segment, or an undulating segment, or any combinations thereof. The contour may be piecewise-linear, piecewise-curved, or both piecewise-linear and -curved. In some embodiments, the contour is polygonal or generally polygonal, for example, triangular, rectangular, pentagonal, hexagonal, or any n-sided polygon, or n-sided general polygon where the sides of the general polygon may be straight or curved and define angles at their respective intersections.

In some embodiments, outer contact wall 12 and inner rim 14 have the same contour shape, but different sizes (with inner rim 14 substantially conforming to the contour of outer contact wall 12, but being a smaller size). In other embodiments, outer contact wall 12 and inner rim 14 have different respective contours.

In some embodiments, cart bumper 10 is substantially symmetric about inner rim 14, for example, with plurality of spokes 16 evenly distributed about inner rim 14. In other embodiments, cart bumper 10 may be asymmetric. The asymmetry may arise from one or more of an uneven distribution of plurality of spokes 16, an offset position of inner rim 14 relative to a geometric center of cart bumper 10, an asymmetric shape of path 17, an asymmetric contour of outer contact wall 12, or an asymmetric contour of inner rim 14.

In some embodiments, cart bumper 10 further includes a mounting ring 20. For example, mounting ring 20 may be disposed within inner rim 14, so that an inner surface 18 defined by inner rim 14 contacts an outer surface 22 defined by mounting rim 20. In some such embodiments, cart bumper 10 may be mounted on a bumper axle such that an inner surface 24 defined by mounting ring 20 contacts the bumper axle or faces the bumper axle.

Mounting ring 20 may include any material described with reference to inner rim 14 (or cart bumper 10). In some embodiments, mounting ring 20 may include a nylon, a polypropylene, a polyethylene, or an ultrahigh molecular weight (UHMW) polyethylene. In some embodiments, the material of mounting ring 20 is the same as that of inner rim 14. In other embodiments, the material of mounting ring 20 is different from that of inner rim 14. Mounting ring 20 may be secured to inner rim 14 by at least one of a frictional joint, a mechanical joint, an adhesive joint, an overmold, or a weld, for example, between inner surface 18 of inner rim and outer surface 22 of mounting ring 20. In some examples, mounting ring 20 is substantially cylindrical.

While outer surface 22 of mounting ring may be substantially smooth, as shown in FIG. 1B, in other embodiments, an outer surface of a mounting ring according to the present disclosure may exhibit one or more raised features or depressions to secure the fit between inner rim 14 and the mounting ring, for example, as described with reference to FIG. 2A.

Figure 2A:
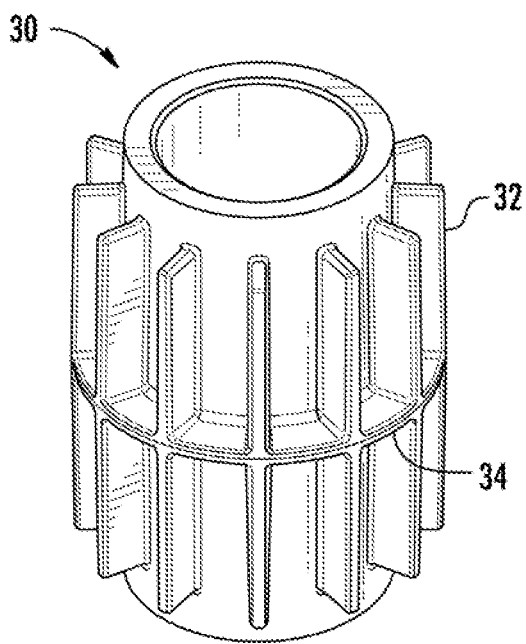
FIG. 2A is a conceptual perspective view of a mounting ring according to embodiments.
Figure 2B:
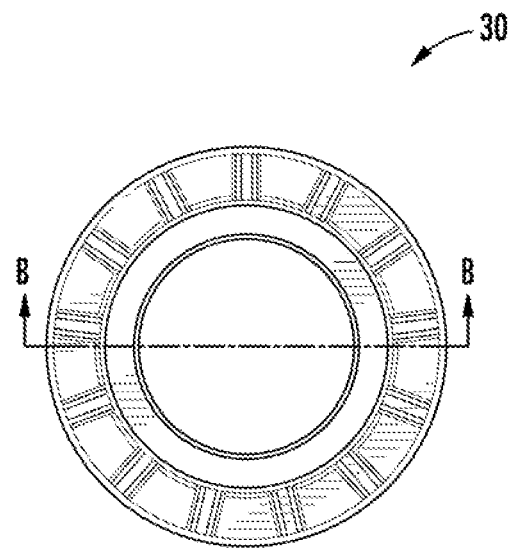
FIG. 2B is a conceptual top view of the mounting ring of FIG. 2A.
Figure 2C:
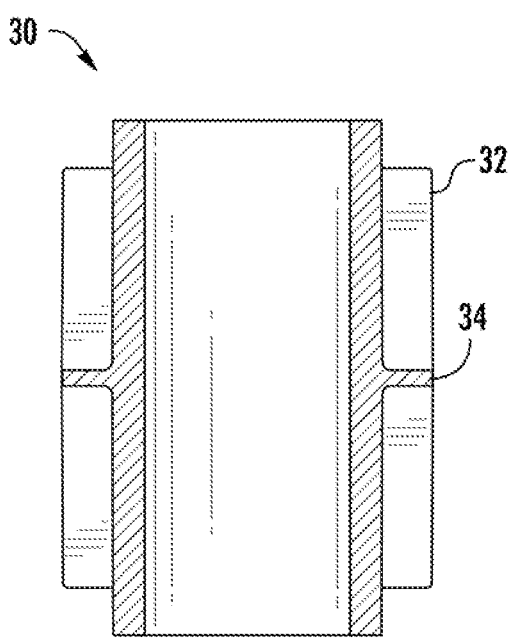
FIG. 2C is a conceptual cross-sectional view of the mounting ring of FIG. 2B, along section B-B.
Figure 2D:
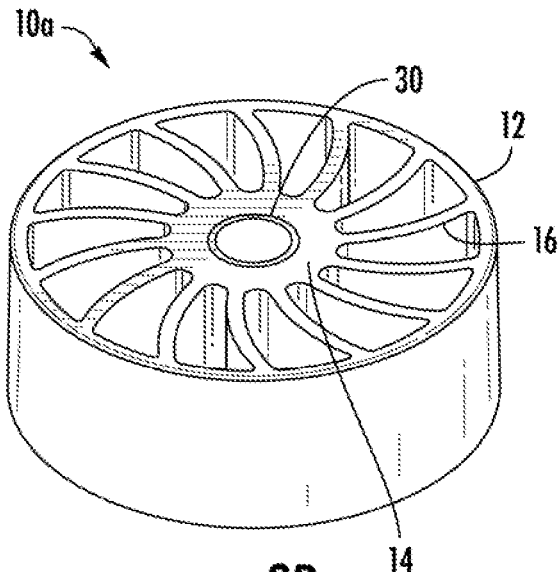
FIG. 2D is a conceptual perspective view of a cart bumper including the mounting ring of FIG. 2A.
Figure 2E:
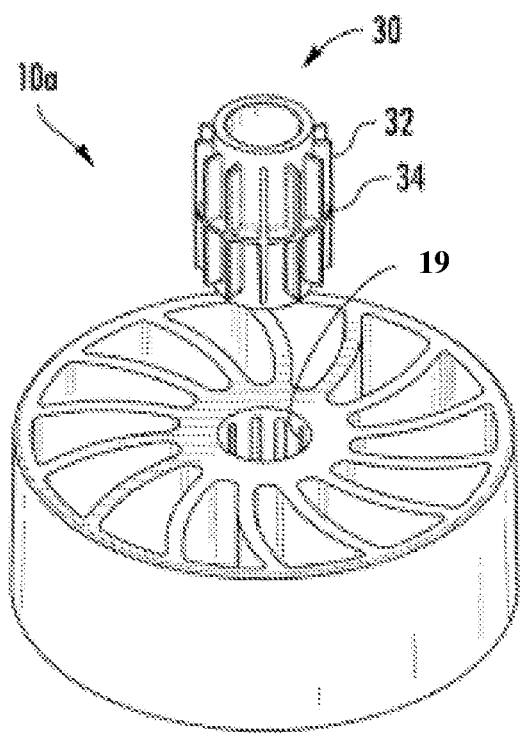
FIG. 2E is a conceptual exploded view of the cart bumper of FIG. 2D.
Figure 2F:
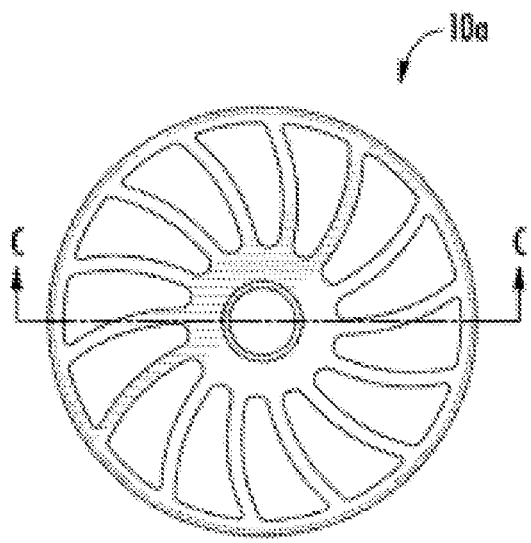
FIG. 2F is a conceptual top view of the cart bumper of FIG. 2D.
Figure 2G:
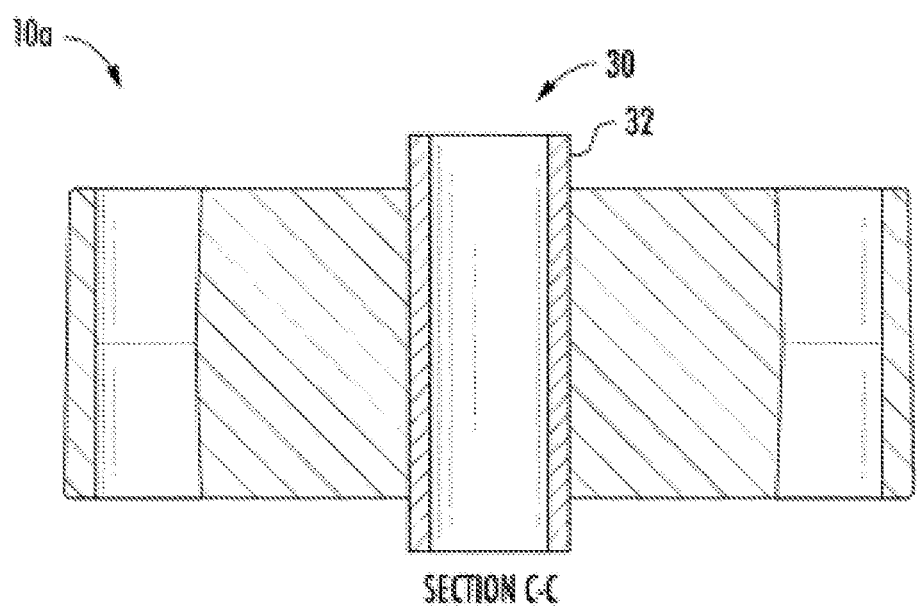
FIG. 2G is a conceptual cross-sectional view of the cart bumper of FIG. 2F, along section C-C.

FIG. 2A is a conceptual perspective view of a mounting ring 30 according to embodiments of the disclosure. FIG. 2B is a conceptual top view of mounting ring 30 of FIG. 2A. FIG. 2C is a conceptual cross-sectional view of mounting ring 30 of FIG. 2B, along section B-B. FIG. 2D is a conceptual perspective view of a cart bumper 10a including mounting 30 ring of FIG. 2A. FIG. 2E is a conceptual exploded view of cart bumper 10a of FIG. 2D. FIG. 2F is a conceptual top view of cart bumper 10a of FIG. 2D. FIG. 2G is a conceptual cross-sectional view of cart bumper 10a of FIG. 2F along section C-C.

The structure, composition, and configuration of cart bumper 10a of FIG. 2D may be similar to that of cart bumper 10 described with reference to FIGS. 1A to 1D, with mounting ring 30 instead of mounting ring 20. The composition of mounting ring 30 may be substantially to that of mounting ring 20. An outer surface of mounting ring 30 defines a plurality of protruding ribs 32 configured to securely engage with inner surface 18 of inner rim 14 of cart bumper 10a. In some embodiments, mounting ring 30 defines secondary rib 34, for example, normal to ribs 32 and extending outward from mounting ring 30. Mounting ring 30 may be secured to inner rim 14 of cart bumper 10a by at least one of a frictional joint, a mechanical joint, an adhesive joint, an overmold, or a weld, for example, between inner surface 18 of inner rim and an outer surface, protruding ribs 32, or secondary rib 34 of mounting ring 20. In some embodiments, inner surface 18 of inner rim 14 may define recesses 19 that are complementary to ribs 32 or otherwise dimensioned to accommodate or receive respective ribs 32. In other embodiments, ribs 32 may push into or extend into inner surface 18 and cause inner surface 18 to deform, deflect, or rearrange about ribs 32 to accommodate or receive ribs 32.

Thus, embodiments of cart bumpers that may cushion, shield, reduce, absorb, or otherwise mitigate a force have been described. The force may include a reaction force from an adjacent wall or structure to one or more of a push, a jolt, a shove, an impact, or any momentary, intermittent, or continuous force. One or more cart bumpers according to the present disclosure may be disposed at suitable locations on or along a cart, or on or along any other object or component prone to bumping or contacting another surface.

In embodiments, a cart according to the present disclosure includes cart bumper 10 or 10a, and a bumper axle passing through inner rim 14 of cart bumper 10 or 10a such that spokes 16 and outer contact wall 12 are disposed about the bumper axle. The cart may include a utility cart, a housekeeping cart, an industrial cart, a clinical cart, a hospital cart, a medical cart, or any cart configured to hold, store, or carry objects or cargo. The carts may include wheels for providing or supporting motion. The cart may be powered or propelled by a user or by a motor external or internal to the cart. In some embodiments, cart bumper 10 or 10a is fixed relative to the bumper axle. In other embodiments, cart bumper 10 or 10a is rotatable about the bumper axle. In some such embodiments, cart bumper 10 or 10a defines a rotational axis aligned with the bumper axle and extending through inner rim 14 and perpendicular to the respective paths 17 of plurality of spokes 16. In some embodiments, the bumper axle is aligned with a direction of gravity. In some embodiments, the bumper axle is perpendicular to the direction of gravity. In some embodiments, the bumper axle is at any suitable angle relative to the direction of gravity.

Embodiments of carts including one or more cart bumpers are described with reference to FIGS. 3 to 8D.

Figure 3:
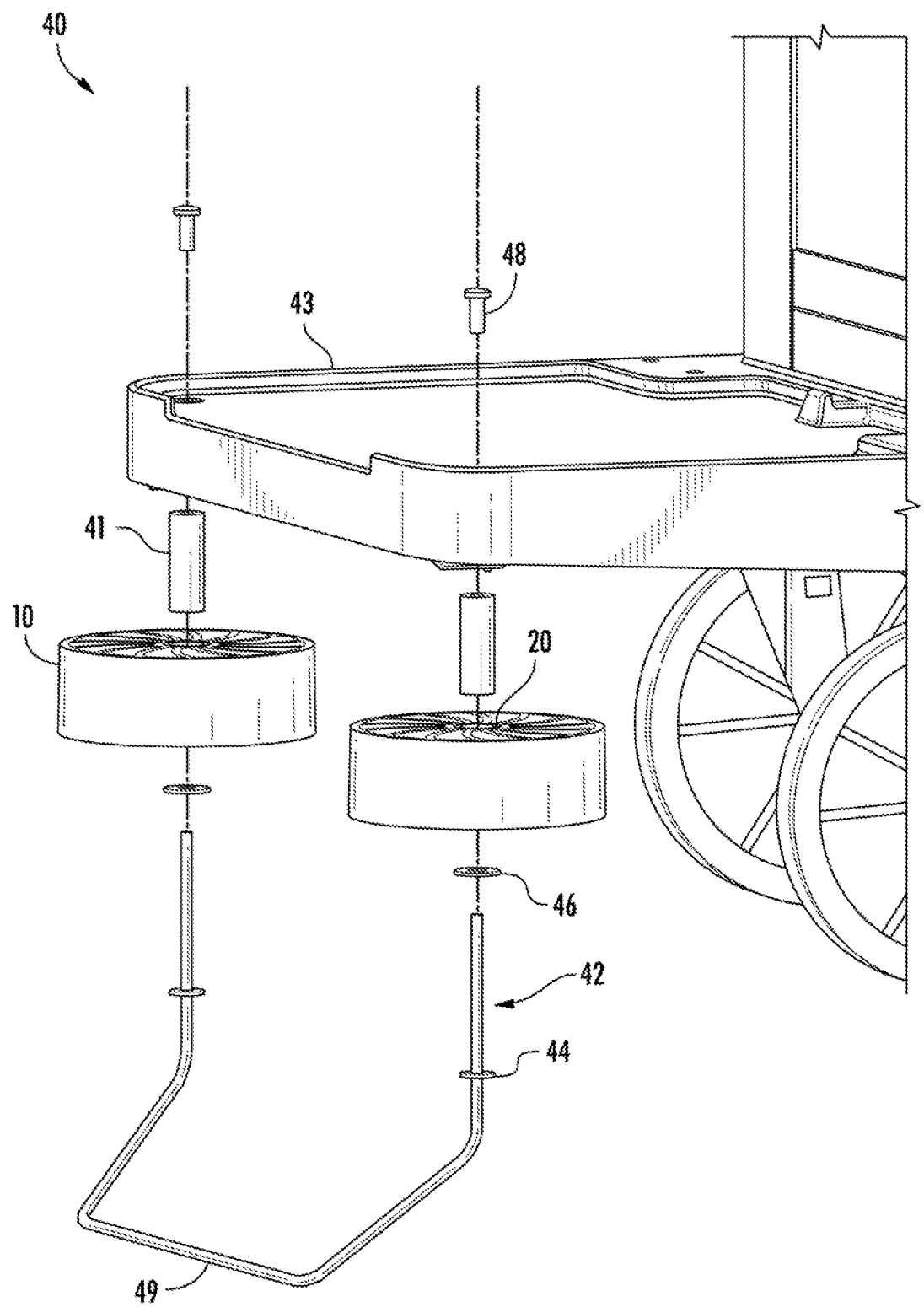
FIG. 3 is a conceptual exploded view of a cart including a cart bumper and a bumper axle according to embodiments.

FIG. 3 is a conceptual exploded view of a cart 40 including a cart bumper 10 and a bumper axle 42 according to embodiments. Cart bumper 10 is mounted on bumper axle 42 at a base 43 of cart 40 via mounting ring 20 and a mounting sleeve 41, with bumper axle 42 passing through inner rim 14 (and through an opening defined by mounting ring 20). In some embodiments, bumper axle 42 may define a flange 44. In some embodiments, cart 40 includes a washer 46 and a cap 48 to secure cart bumper 10. Cart bumper 10 may be positioned about bumper axle 42 such that cart bumper 10 can freely rotate about bumper axle 42, rotate with resistance, or be fixed and unable to rotate. Cart 40 may include more than one cart bumper 10. Each cart bumper 10 may be positioned about a respective bumper axle 42, or more than one cart bumper 10 may be positioned about the same bumper axle 42, as shown in FIG. 3. In some embodiments, a projection 49 defined by bumper axle between cart bumpers 10 may provide a further deflecting or otherwise protective shield. Bumper axle 42 may include a rigid or flexible material. The rigid material may include one or more of a metal, an alloy, a polymer, or any suitable rigid material or composite. The flexible material may include any material described with reference to cart bumper 10. While cart 40 includes cart bumper 10 including mounting ring 20, in other embodiments, cart 40 may include cart bumper 10a including mounting ring 30. In some embodiments, each cart bumper 10 or 10a of cart 40 may have substantially the same composition, structure, orientation, or configuration. In other embodiments, different cart bumpers 10 or 10a of cart 40 may differ in one or more of composition, structure, orientation, or configuration. While cart bumper 10 is shown as horizontal relative to a direction of gravity in FIG. 3, cart bumper 10 may be oriented in any suitable orientation relative to the direction of gravity, for example, vertical, or an inclined or skewed angle.

Figure 4:
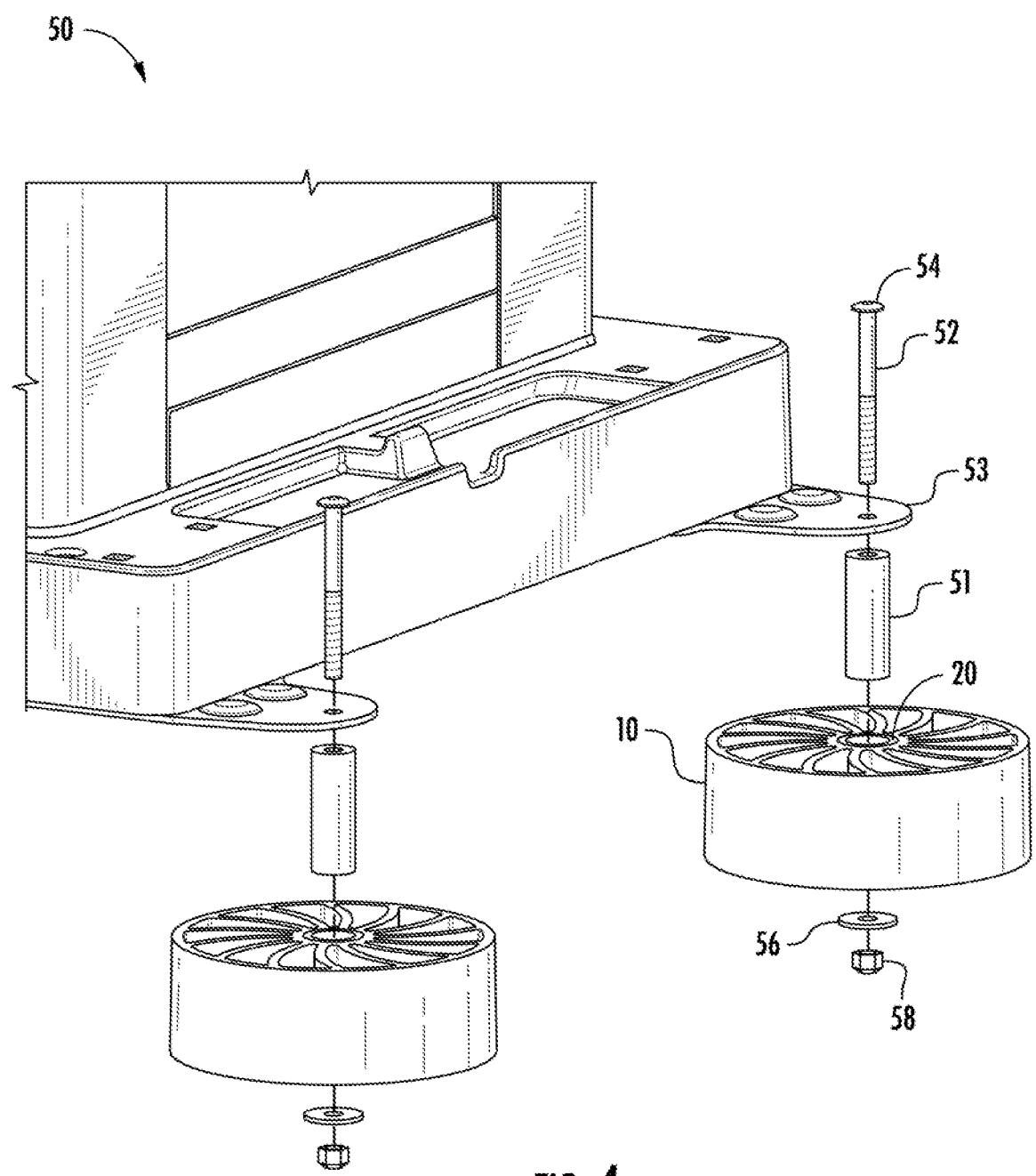
FIG. 4 is a conceptual exploded view of a cart including a cart bumper and a bumper axle according to embodiments.

FIG. 4 is a conceptual exploded view of a cart 50 including a cart bumper 10 and a bumper axle 52 according to embodiments. Cart bumper 10 is mounted on bumper axle 52 at a base 53 of cart 50 via mounting ring 20 and a mounting sleeve 51, with bumper axle 52 passing through inner rim 14 (and through an opening defined by mounting ring 20). In some embodiments, bumper axle 52 may define a cap 54. In some embodiments, cart 50 includes a washer 56 and a cap 58 to secure cart bumper 10. Cart bumper 10 may be positioned about bumper axle 52 similar to the manner described with reference to cart 40 of FIG. 3. While cart 50 includes cart bumper 10 including mounting ring 20, in other embodiments, cart 50 may include cart bumper 10a including mounting ring 30.

Figure 5:
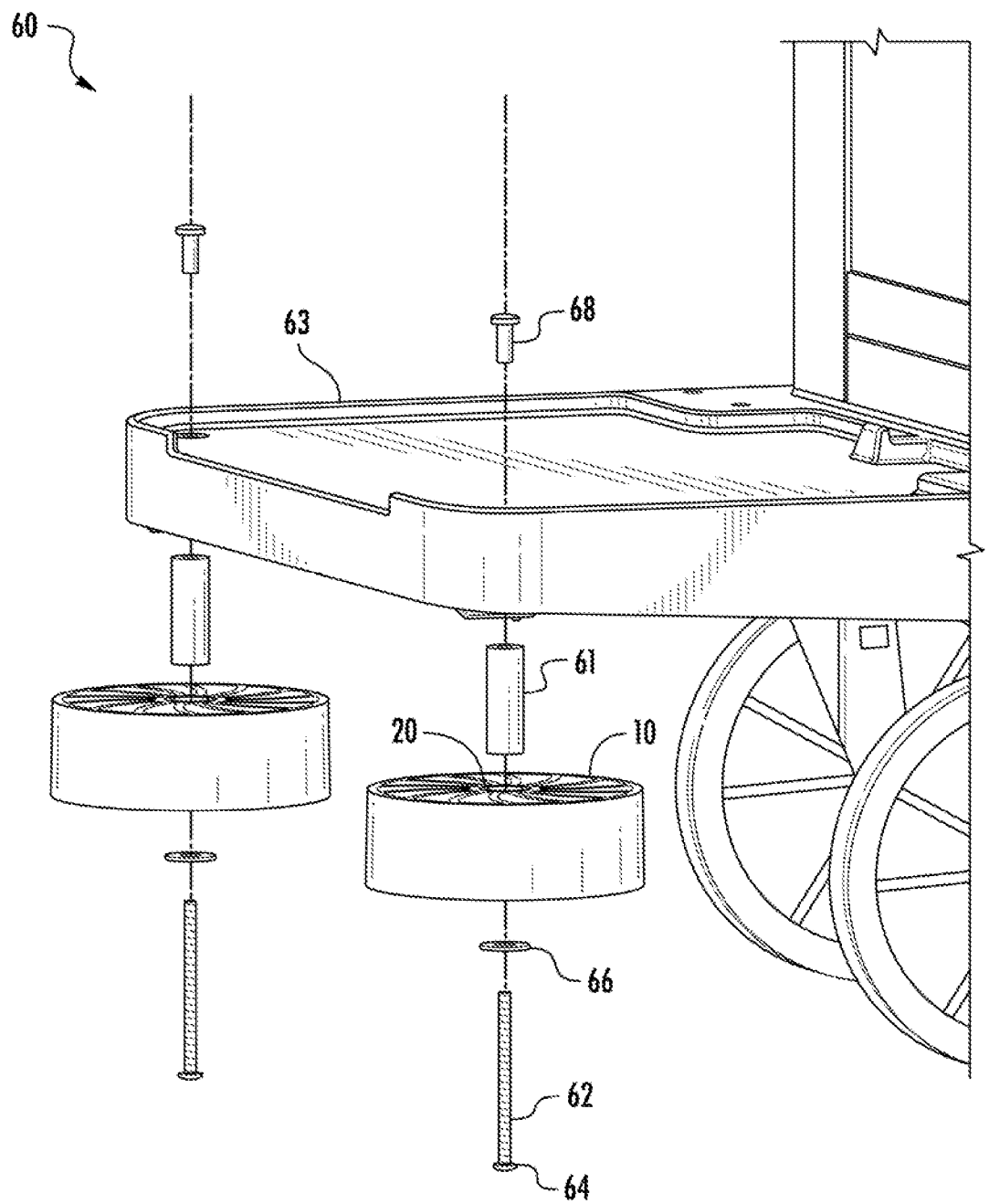
FIG. 5 is a conceptual exploded view of a cart including a cart bumper and a bumper axle according to embodiments.

FIG. 5 is a conceptual exploded view of a cart 60 including cart bumper 10 and a bumper axle 62 according to embodiments. Cart bumper 10 is mounted on bumper axle 62 at a base 63 of cart 60 via mounting ring 20 and a mounting sleeve 61, with bumper axle 62 passing through inner rim 14 (and through an opening defined by mounting ring 20). In some embodiments, bumper axle 62 may define a cap 64. In some embodiments, cart 60 includes a washer 66 and a cap 68 to secure cart bumper 10. Cart bumper 10 may be positioned about bumper axle 62 similar to the manner described with reference to cart 40 of FIG. 3. While cart 60 includes cart bumper 10 including mounting ring 20, in other embodiments, cart 60 may include cart bumper 10a including mounting ring 30.

While mounting sleeves 41, 51, and 61 have been described with reference to FIGS. 3 to 5, in other embodiments, bumper 10 or 10a may be mounted on a mounting axle without a mounting sleeve.

FIG. 6A is a conceptual partial perspective view of a cart 70 including cart bumper 10 and a bumper axle (not shown) according to embodiments. FIG. 6B is a conceptual partial perspective view of 70 cart of FIG. 6A. FIG. 6C is a conceptual partial exploded view of cart 70 of FIG. 6B. Cart bumper 10 is mounted on the bumper axle at a base 73 of cart 70 via mounting ring 20, with the bumper axle passing through inner rim 14 (and through an opening defined by mounting ring 20). Cart bumper 10 may be positioned about the bumper axle similar to the manner described with reference to cart 40 of FIG. 3. While cart 70 includes cart bumper 10 including mounting ring 20, in other embodiments, cart 70 may include cart bumper 10a including mounting ring 30.

Figure 7A:
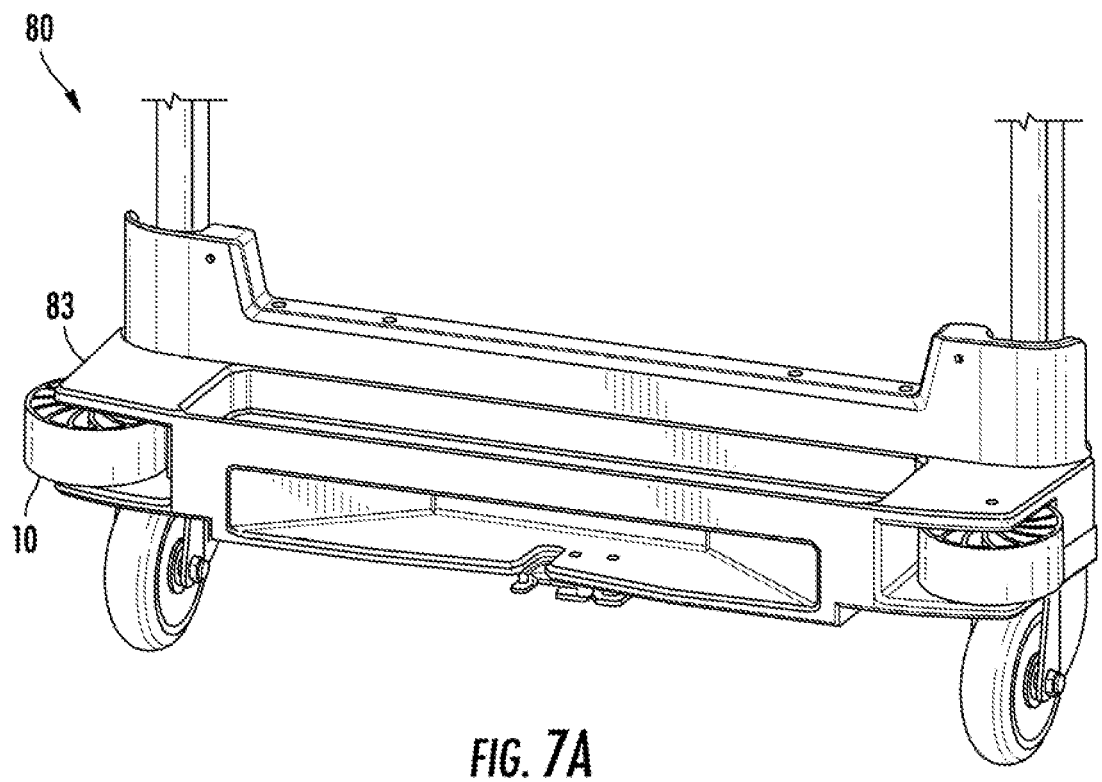
FIG. 7A is a conceptual partial perspective view of a cart including a cart bumper according to embodiments.
Figure 7B:
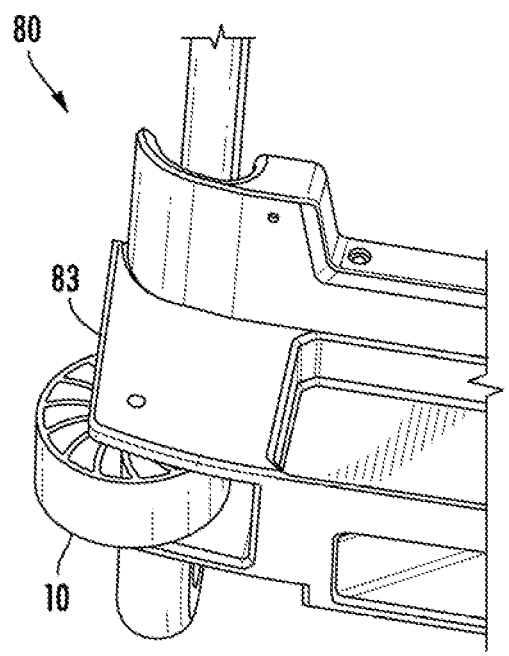
FIG. 7B is a conceptual partial perspective view of the cart of FIG. 7A.
Figure 7C:
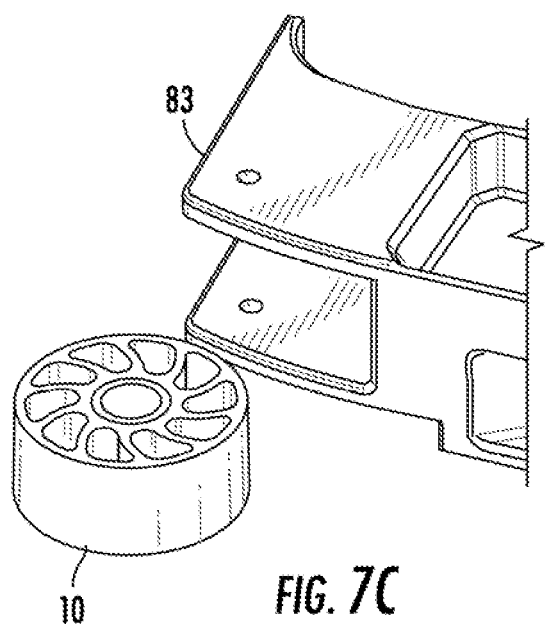
FIG. 7C is a conceptual partial exploded view of the cart of FIG. 7B.

FIG. 7A is a conceptual partial perspective view of a cart 80 including a cart bumper according to embodiments. FIG. 7B is a conceptual partial perspective view of cart 80 of FIG. 7A. FIG. 7C is a conceptual partial exploded view of cart 80 of FIG. 7B. Cart bumper 10 is mounted on the bumper axle at a base 83 of cart 70 via mounting ring 20, with the bumper axle passing through inner rim 14 (and through an opening defined by mounting ring 20). Cart bumper 10 may be positioned about the bumper axle similar to the manner described with reference to cart 40 of FIG. 3. While cart 50 includes cart bumper 80 including mounting ring 20, in other embodiments, cart 80 may include cart bumper 10a including mounting ring 30.

Figure 8A:
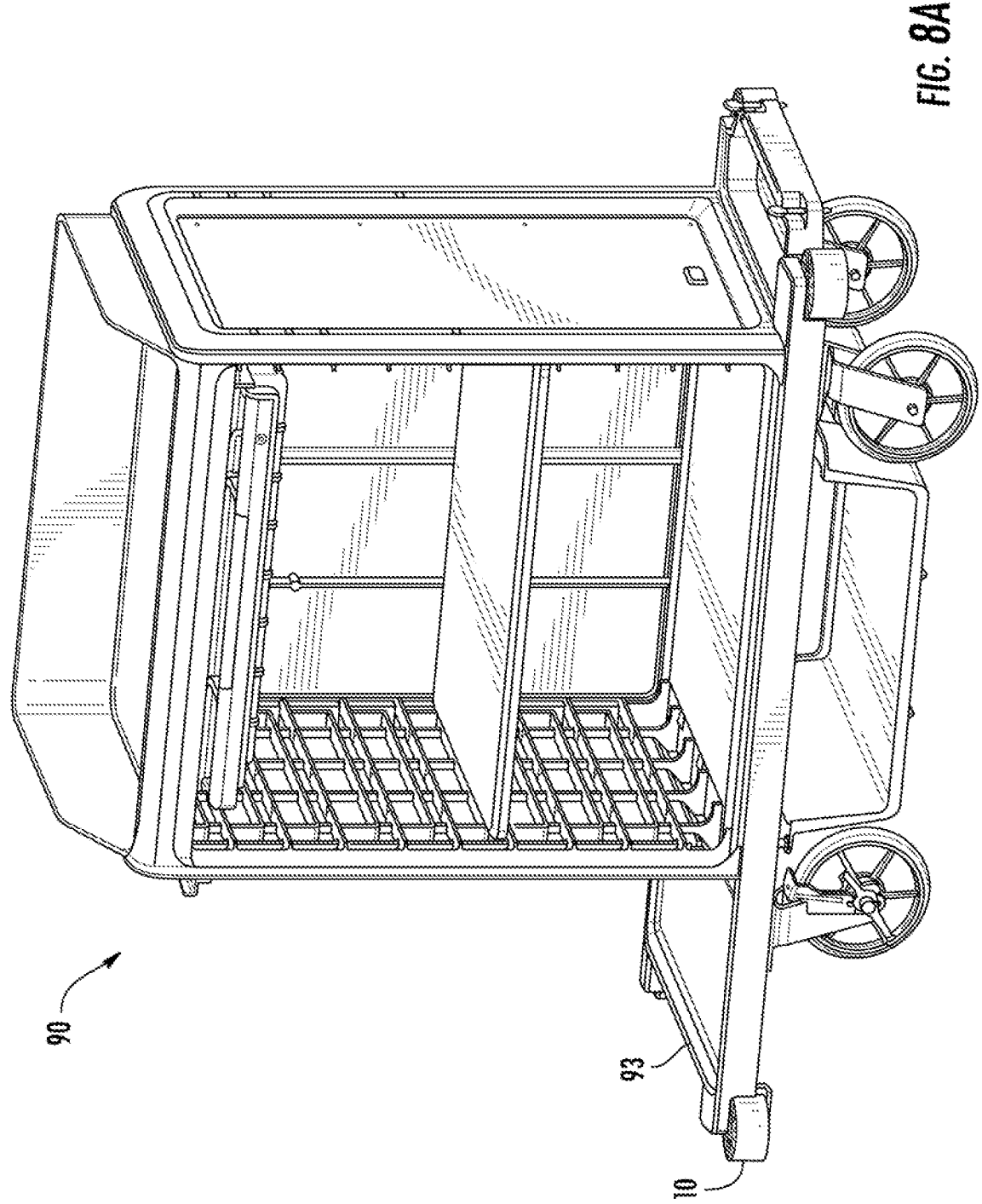
FIG. 8A is a conceptual perspective view of a cart including a cart bumper and a bumper axle according to embodiments.
Figure 8B:
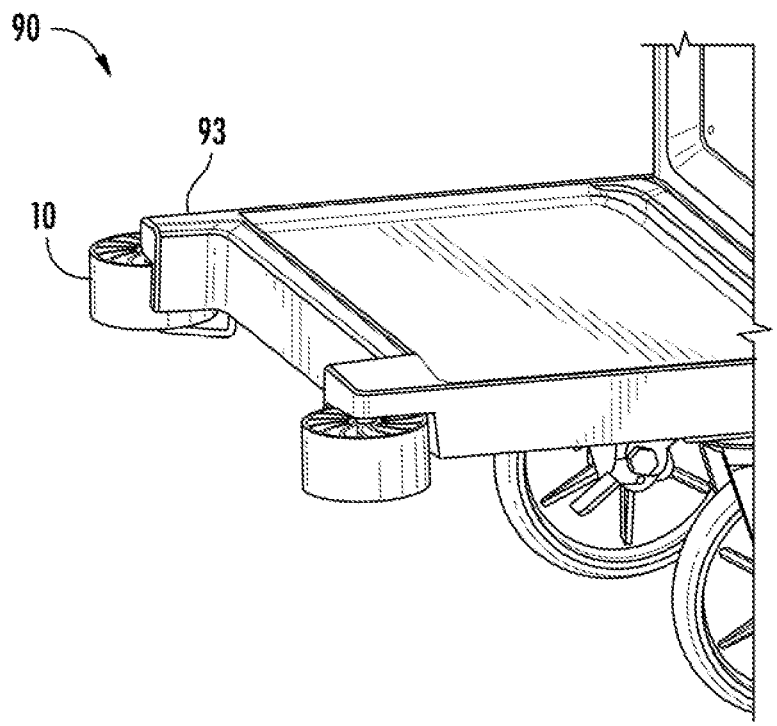
FIG. 8B is a conceptual partial perspective view of the cart of FIG. 8A.
Figure 8C:
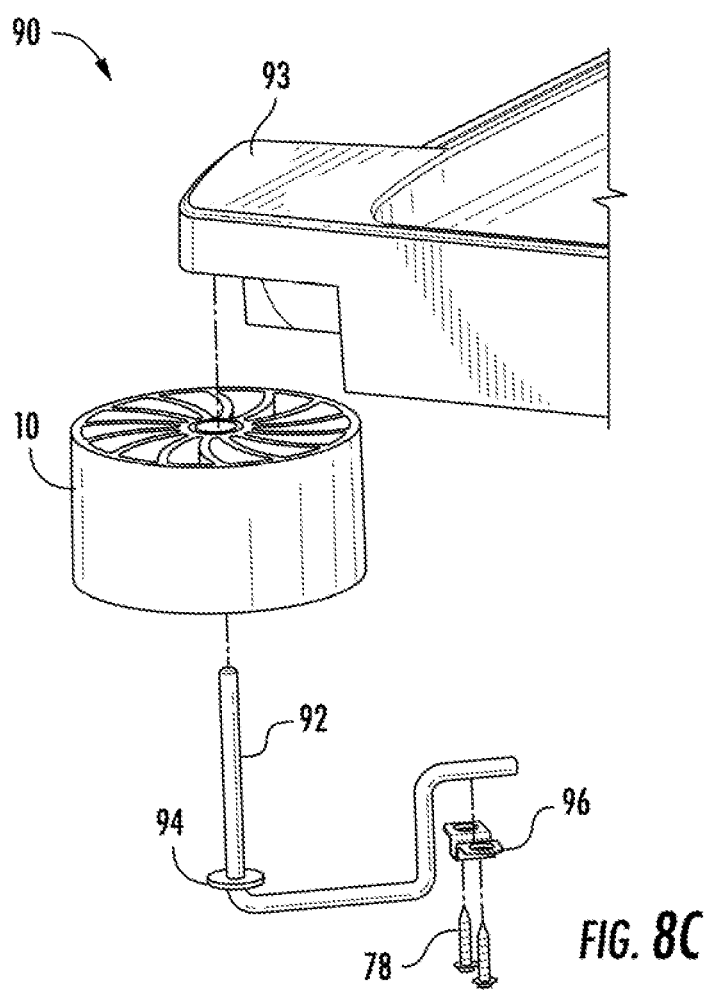
FIG. 8C is a conceptual partial exploded view of the cart of FIG. 8B.

FIG. 8A is a conceptual perspective view of a cart 90 including a cart bumper and a bumper axle 92 according to embodiments. FIG. 8B is a conceptual partial perspective view of cart 90 of FIG. 8A. FIG. 8C is a conceptual partial exploded view of cart 90 of FIG. 8B. Cart bumper 10 is mounted on bumper axle 92 at a base 93 of cart 90 via mounting ring 20, with bumper axle 92 passing through inner rim 14 (and through an opening defined by mounting ring 20). In some embodiments, bumper axle 92 may define a flange 94. In some embodiments, cart 90 includes a washer 96 and screws 96 to secure cart bumper 10. Cart bumper 10 may be positioned about bumper axle 92 similar to the manner described with reference to cart 40 of FIG. 3. While cart 90 includes cart bumper 10 including mounting ring 20, in other embodiments, cart 90 may include cart bumper 10a including mounting ring 30.

While carts according to different embodiments may be described with reference to particular embodiments of cart bumpers, carts according to the present disclosure may include any suitable cart bumper according to the present disclosure, more than one cart bumper according to the present disclosure, and the same or different cart bumpers according to the present disclosure.

Thus, cart bumpers and carts including cart bumpers have been described.

The following enumerated items describe aspects of the disclosure.

Item 1: A cart bumper, including:
an outer contact wall;
an inner rim; and
a plurality of spokes extending from the inner rim to the outer contact wall, each spoke of the plurality of spokes defining a respective path,
wherein the outer contact wall and the plurality of spokes are configured to collapse in response to a mechanical force applied on the outer contact wall above a predetermined threshold force.

Item 2: The cart bumper of item 1, wherein the outer contact wall and the plurality of spokes are configured to collapse inwardly toward the inner rim.

Item 3: The cart bumper of item 2, wherein the outer contact wall and the plurality of spokes are configured to collapse inwardly by at least 1 inch toward the inner rim.

Item 4: The cart bumper of item 3, wherein the outer contact wall and the plurality of spokes are configured to collapse inwardly by at least 1.5 inch toward the inner rim.

Item 5: The cart bumper of any one of items 1 to 4, wherein the respective path includes at least one of a circular arc segment, an elliptical arc segment, a parabolic arc segment, a hyperbolic arc segment, a spiral arc segment, a sinusoid arc segment, a sigmoid arc segment, a linear segment, or an undulating segment.

Item 6: The cart bumper of item 5, wherein the respective path of each spoke of the plurality of spokes is substantially the same.

Item 7: The cart bumper of any of items 1 to 6, wherein the cart bumper defines a rotational axis extending through the inner rim and perpendicular to the respective paths of the plurality of spokes, and wherein the outer contact wall, the inner rim, and the plurality of spokes extend in a direction along the rotational axis between a first plane and a second plane.

Item 8: The cart bumper of any of items 1 to 8, further including a mounting ring, wherein an outer surface defined by the mounting ring is in contact with an inner surface defined by the inner rim.

Item 9: The cart bumper of item 8, wherein the mounting ring is secured to the inner rim by at least one of a frictional joint, a mechanical joint, an adhesive joint, an overmold, or a weld.

Item 10: The cart bumper of item 8 or 9, wherein the outer surface of the mounting ring defines a plurality of protruding ribs configured to securely engage with the inner surface of the inner rim.

Item 11: The cart bumper of item 10, wherein each protruding rib of the plurality of protruding ribs extends between a first end and a second end and outward from the mounting ring and toward the inner surface of the inner rim.

Item 12: The cart bumper of any of items 1 to 11, wherein the outer contact wall and the plurality of spokes comprise a resilient flexible material.

Item 13: The cart bumper of item 12, wherein the inner rim includes the resilient flexible material.

Item 14: The cart bumper of item 13, wherein the outer contact wall, the plurality of spokes, and the inner rim are integrally formed.

Item 15: The cart bumper of any of items 12 to 14, wherein the resilient flexible material includes a polyurethane.

Item 16: The cart bumper of item 15, wherein the resilient flexible material consists essentially of the polyurethane.

Item 17: A cart comprising:
the cart bumper of any of items 1 to 16; and
a bumper axle passing through the inner rim of the cart bumper such that the spokes and the outer contact wall are disposed about the bumper axle.

Item 18: The cart of item 17, wherein the cart bumper is rotatable about the bumper axle.

Item 19: The cart of item 18, wherein the cart bumper defines a rotational axis aligned with the bumper axle and extending through the inner rim and perpendicular to the respective paths of the plurality of spokes.

Item 20: The cart of any of items 17 to 19, wherein the bumper axle is aligned with a direction of gravity.

What is claimed is:

1. A cart bumper comprising:
an outer contact wall;
an inner rim;
and a plurality of spokes extending from the inner rim to the outer contact wall and about the inner rim;
wherein each spoke of the plurality of spokes defines a respective path, and
wherein the outer contact wall and the plurality of spokes are configured to collapse in response to a mechanical force applied on the outer contact wall, and
a mounting ring;
wherein an outer surface defined by the mounting ring is in contact with an inner surface defined by the inner rim,
wherein the outer surface of the mounting ring defines a plurality of protruding ribs configured to securely engage with the inner surface of the inner rim, and
wherein the inner surface of the inner rim defines a plurality of recesses configured to receive a respective protruding rib.

2. The cart bumper of claim 1, wherein the outer contact wall and the plurality of spokes are configured to collapse inwardly toward the inner rim.

3. The cart bumper of claim 1, wherein the outer contact wall and the plurality of spokes are configured to collapse inwardly by at least 1 inch toward the inner rim.

4. The cart bumper of claim 1, wherein the outer contact wall and the plurality of spokes are configured to collapse inwardly by at least 1.5 inch toward the inner rim.

5. The cart bumper of claim 1, wherein the respective path comprises at least one of a circular arc, an elliptical arc, a parabolic arc, a hyperbolic arc, a spiral arc, or a sinusoid arc.

6. The cart bumper of claim 1, wherein the respective path comprises at least one linear segment or at least one zig-zag segment.

7. The cart bumper of claim 1, wherein the respective path of each spoke of the plurality of spokes is substantially the same.

8. The cart bumper of claim 1, wherein the cart bumper defines a rotational axis extending through the inner rim and perpendicular to the respective paths of the plurality of spokes, and wherein the outer contact wall, the inner rim, and the plurality of spokes extend in a direction along the rotational axis between a first plane and a second plane.

9. The cart bumper of claim 1, wherein the mounting ring is secured to the inner rim by at least one of a frictional joint, a mechanical joint, an adhesive joint, an overmold, or a weld.

10. The cart bumper of claim 1, wherein each protruding rib of the plurality of protruding ribs extends between a first plane and a second plane and outward from the mounting ring and toward the inner surface of the inner rim.

11. The cart bumper of claim 1, wherein the outer contact wall and the plurality of spokes comprise a flexible material.

12. The cart bumper of claim 11, wherein the inner rim comprises the flexible material.

13. The cart bumper of claim 12, wherein the outer contact wall, the plurality of spokes, and the inner rim are unitary.

14. The cart bumper of claim 11, wherein the flexible material comprises a polyurethane.

15. The cart bumper of claim 14, wherein the flexible material consists essentially of the polyurethane.

16. A cart comprising:
a bumper axle, and
the cart bumper of claim 1,
wherein the bumper axle passes through the inner rim such that the spokes and the outer contact wall are disposed about the bumper axle.

17. The cart of claim 16, wherein the cart bumper is rotatable about the bumper axle.

18. The cart of claim 16, wherein the bumper axle is aligned with a direction of gravity.

\* \* \* \* \*